(12) United States Patent
Gutride et al.

(10) Patent No.: US 11,928,487 B2
(45) Date of Patent: Mar. 12, 2024

(54) SEAMLESS INTEGRATION OF MULTIPLE APPLICATIONS IN TUTORIALS

(71) Applicant: Red Hat, Inc., Raleigh, NC (US)

(72) Inventors: Dana M. Gutride, Westford, MA (US); Joachim Schuler, Westford, MA (US); Janice A. Wright, Raleigh, NC (US); Zackary R. Allen, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 159 days.

(21) Appl. No.: 17/461,275

(22) Filed: Aug. 30, 2021

(65) Prior Publication Data
US 2023/0061328 A1 Mar. 2, 2023

(51) Int. Cl.
| | |
|---|---|
| G06F 9/451 | (2018.01) |
| G06F 3/0482 | (2013.01) |
| G06F 3/0483 | (2013.01) |
| G06F 3/0484 | (2022.01) |
| G06F 16/93 | (2019.01) |
| G06F 40/134 | (2020.01) |
| G06F 40/14 | (2020.01) |
| G06N 20/00 | (2019.01) |
| G09B 5/02 | (2006.01) |
| G09B 5/06 | (2006.01) |
| G06F 3/04842 | (2022.01) |

(52) U.S. Cl.
CPC ............ *G06F 9/453* (2018.02); *G06F 3/0482* (2013.01); *G06F 3/0483* (2013.01); *G06F 3/0484* (2013.01); *G06F 16/94* (2019.01); *G06F 40/134* (2020.01); *G06F 40/14* (2020.01); *G06N 20/00* (2019.01); *G09B 5/02* (2013.01); *G09B 5/06* (2013.01); *G06F 3/04842* (2013.01)

(58) Field of Classification Search
CPC ...................................................... G06F 16/94
See application file for complete search history.

(56) References Cited

U.S. PATENT DOCUMENTS

| | | | |
|---|---|---|---|
| 7,376,907 | B2 | 5/2008 | Santoro et al. |
| 8,549,430 | B2 | 10/2013 | Russell et al. |
| 8,869,027 | B2 | 10/2014 | Louch et al. |
| 10,579,238 | B2 | 3/2020 | Rauschenbach et al. |
| 10,691,302 | B2 | 6/2020 | Marzouk |
| 10,698,594 | B2 | 6/2020 | Sanches et al. |
| 2009/0024982 | A1* | 1/2009 | Diep ................. G06F 16/957 717/115 |
| 2014/0024005 | A1 | 1/2014 | Rosenthal et al. |

(Continued)

*Primary Examiner* — Baoquoc N To
(74) *Attorney, Agent, or Firm* — Dority & Manning, P.A.

(57) ABSTRACT

Seamless integration of multiple applications in tutorials is disclosed herein. In one example, a processor device of a computing device displays, within browser software, a tutorial interface comprising a tutorial guide, wherein the tutorial guide comprises a plurality of task links, and each task link corresponds to an application of a plurality of applications. The processor device receives, using the browser software via a user input device, a first user input indicating a selected task link among the plurality of task links. Responsive to receiving the first user input, the processor device initiates execution of a first application corresponding to the selected task link, wherein the first application executes within the tutorial interface instead of requiring a user to launch and switch between multiple applications in multiple browser tabs or windows.

19 Claims, 8 Drawing Sheets

(56) References Cited

U.S. PATENT DOCUMENTS

| | | | |
|---|---|---|---|
| 2014/0282136 A1* | 9/2014 | Marantz | G06F 16/1767 715/764 |
| 2021/0042134 A1* | 2/2021 | Elango | G06F 11/3438 |

* cited by examiner

SEAMLESS INTEGRATION OF MULTIPLE APPLICATIONS IN TUTORIALS

BACKGROUND

Training a user to configure, deploy, and/or use modern computing platforms and products may be accomplished using complex tutorial applications that guide the user through a series of tasks. However, conventional tutorial applications may require the user to launch and switch between multiple applications in multiple browser tabs or windows, resulting in a complicated and confusing user environment. Such tutorial applications may also require the user to manually copy and paste relevant data from the tutorial application into other applications to establish connections between, or to otherwise configure, related applications.

SUMMARY

The examples disclosed herein relate to providing seamless integration of multiple applications in tutorials. In some examples, a computing device executes browser software that displays a tutorial guide, which includes a plurality of task links that each correspond to an application of a plurality of applications. Upon receiving a user input that indicates a selected task link among the plurality of task links, the computing device initiates execution of an application corresponding to the selected task link. As the user progresses through the tasks of the tutorial guide, each application is executed within the tutorial interface, thus providing a seamless transition between applications.

In another example, a method is provided. The method comprises displaying, within browser software executed by a computing device, a tutorial interface comprising a tutorial guide, wherein the tutorial guide comprises a plurality of task links, each task link corresponds to an application of a plurality of applications. The method further comprises receiving, by the browser software via a user input device, a first user input indicating a selected task link among the plurality of task links. The method also comprises, responsive to receiving the first user input, initiating execution of a first application corresponding to the selected task link, wherein the first application executes within the tutorial interface.

In another example, a computing device is provided. The computing device comprises a system memory and a processor device communicatively coupled to the system memory. The processor device is to display, within browser software, a tutorial interface comprising a tutorial guide, wherein the tutorial guide comprises a plurality of task links, and each task link corresponds to an application of a plurality of applications. The processor device is further to receive, using the browser software via a user input device, a first user input indicating a selected task link among the plurality of task links. The processor device is also to, responsive to receiving the first user input, initiate execution of a first application corresponding to the selected task link, wherein the first application executes within the tutorial interface.

In another example, a computer program product is provided. The computer program product is stored on a non-transitory computer-readable storage medium, and includes computer-executable instructions that, when executed, cause one or more processor devices to display, within browser software, a tutorial interface comprising a tutorial guide, wherein the tutorial guide comprises a plurality of task links, and each task link corresponds to an application of a plurality of applications. The computer-executable instructions further cause the one or more processor devices to receive, using the browser software via a user input device, a first user input indicating a selected task link among the plurality of task links. The computer-executable instructions also cause the one or more processor devices to, responsive to receiving the first user input, initiate execution of a first application corresponding to the selected task link, wherein the first application executes within the tutorial interface.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first user input" and "second user input," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Modern computing platforms and products may rely on functionality provided by multiple other products, each of which may require separate configuration and interconnection. For instance, deploying a streaming platform such as Apache Kafka® may require not only configuration of Kafka itself, but also connections to a workspace (such as a Red Hat® CodeReady Workspace, as a non-limiting example) as well as an application platform (such as Red Hat® OpenShift®, as a non-limiting example), each of which may also require separate configuration. Due to this complexity, users seeking guidance in configuring, deploying, and/or using such products may be provided with a correspondingly complex tutorial application that steers the user through a series of tasks for training on the various products. However, conventional tutorial applications may require the user to launch and switch between multiple applications (e.g., web-based console applications for configuring products) in multiple browser tabs or windows, resulting in a complicated and confusing user environment. Such tutorial applications may also require the user to manually copy and paste relevant data from the tutorial application into other applications (e.g., to establish connections between, or to otherwise configure, related applications).

In this regard, examples disclosed herein relate to providing seamless integration of multiple applications in tutorials. In some examples, a computing device executes browser software that displays a tutorial interface. The tutorial interface includes a tutorial guide that represents, e.g., a configuration process or a specific use case involving multiple products. The term "product" and derivatives thereof are used herein to refer to enterprise-level software that provides services such as container management, media streaming, database access and/or management, software-as-a-service (SaaS), integrated development environments (IDEs), source code management, virtual machine (VM) management, and the like, as non-limiting examples. The tutorial guide comprises a plurality of task links that each corresponds to one of a plurality of applications, and represents, for example, one step in the configuration process. The term "application" and derivatives thereof are used herein to refer to downloadable, browser-executable software that is accessible via a local or remote server computing device, and that provides functionality for accessing or configuring an associated product. Thus, as a non-limiting example, an application may comprise a console application, a graphical user interface (GUI) configuration application, a source code editor, a dashboard, and/or the like, through which configuration settings for an associated product may be edited or features for the associated product may be accessed.

Upon receiving a user input that indicates a selected task link among the plurality of task links, the computing device initiates execution of an application corresponding to the selected task link within the tutorial interface (i.e., without requiring a new browser window or tab to be launched). In some examples, the application executes within a designated sub-portion of the tutorial interface while retaining top-level user interface elements of the tutorial interface, while some examples may provide that the application takes over the tutorial interface during execution. Some examples may also provide that each task link corresponds to an application guide comprising a plurality of application-specific sub-task links (e.g., that walk the user through the steps for configuring or accessing features of the particular product). In such examples, the application guide corresponding to the selected task like may also be displayed within the tutorial interface. In this manner, the tutorial provides a seamless transition between the applications corresponding to the task links of the tutorial guide as the user progresses through the tutorial guide.

Initiating execution of an application within the tutorial interface may be accomplished in different ways in some examples. For instance, some examples may provide that browser-executable code for executing the application may be retrieved from a server computing device, injected into the tutorial interface (i.e., dynamically written into the code underlying the tutorial interface), and then executed. In examples in which the application itself is configured to support execution as part of the tutorial guide (e.g., by providing the same or similar top-level user interface elements and appropriate navigation links to return to the tutorial interface), the browser software may be directed to a Universal Resource Locator (URL) corresponding to the application. Some examples may provide that the tutorial interface comprises an inline frame ("IFRAME"), in which case the IFRAME may be directed to a URL corresponding to the application.

According to some examples, the computing device may subsequently receive, via the user input device, a second user input indicating completion of the selected task link (e.g., when the steps for configuring or accessing features of a product have been successfully performed). Upon receiving the second user input, the tutorial guide is again displayed within the tutorial interface, thus allowing the user the opportunity to select another task link within the tutorial guide. As the user moves between task links and/or completes a selected task link, the tutorial according to some examples may provide additional functionality to assist the user. For instance, in some examples, the computing device may store a data element during execution of a first application, and then retrieve the data element during a subsequent execution of a second application. By persisting the data element, the user is relieved of the need to manually record or recall data provided by the first application that may later be needed by the second application. The tutorial interface may also assist the user by programmatically manipulating a user interface element of an application during execution of the application (e.g., by autofilling a text field or automatically clicking a button, as non-limiting examples). The user interface element may be programmatically manipulated via an application programming interface (API) of the application, and/or may be programmatically manipulated via a browser extension of the browser software.

In examples in which the tutorial guide is one of a plurality of tutorial guides, the computing device may apply machine learning (ML) techniques to the tutorial guides to identify suggested applications that may be of interest to the user. Thus, in such examples, the computing device may generate an ML model based on the plurality of tutorial guides and, based on the ML model, may identify one or more suggested applications.

Figure 1:
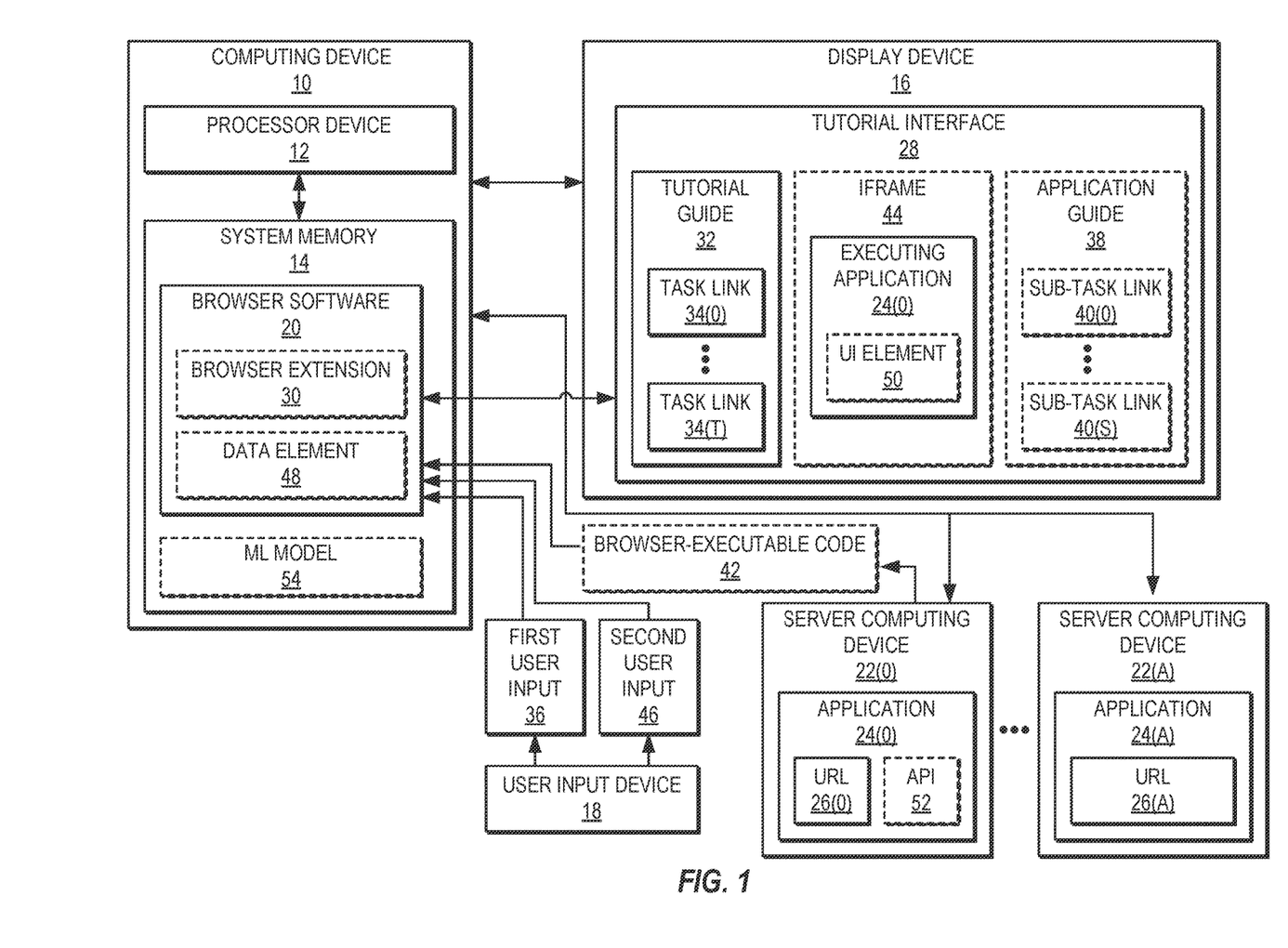
FIG. 1 is a block diagram of a computing device in which examples may be practiced.

To illustrate a computing device on which examples may be practiced, FIG. 1 is provided. In FIG. 1, a computing device 10 includes a processor device 12 communicatively coupled to a system memory 14. The computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some examples of the computing device 10 may include more or fewer elements than illustrated in FIG. 1. For example, the processor device 12 may further include one or more functional units, instruction caches, unified caches, memory controllers, interconnect buses, and/or additional memory devices, caches, and/or controller circuits, which are omitted from FIG. 1 for the sake of clarity.

The computing device 10 of FIG. 1 is communicatively coupled to a display device 16, which may comprise any conventional display device such as a Light-Emitting Diode (LED), Liquid Crystal Display (LCD), or Cathode Ray Tube (CRT) display, a Virtual Reality (VR) headset or display, and the like, as non-limiting examples. The computing device 10 is further communicatively coupled to a user input device 18, through which a user (not shown) may provide input to software executing on the computing device 10. The processor device 12 of the computing device 10 executes browser software 20, which may comprise conventional or custom software for accessing web pages or web-based applications via URLs.

In the example of FIG. 1, the computing device 10 is also communicatively coupled to a plurality of server computing devices 22(0)-22(A), via a private network or a public network such as the internet. The server computing devices 22(0)-22(A) host a corresponding plurality of applications 24(0)-24(A). The applications 24(0)-24(A) each comprise downloadable, browser-executable software that is accessible via a corresponding URL 26(0)-26(A), and that provides functionality for configuring or accessing an associated product (not shown). In some examples, each of the applications 24(0)-24(A) may comprise an integral component of the product itself, while some examples may provide that the applications 24(0)-24(A) are separate components that interface with the corresponding products. As a non-limiting example, each of the applications 24(0)-24(A) may comprise a console application, a GUI configuration application, a source code editor, a dashboard, and/or the like, through which configuration settings for an associated product may be edited or features for the associated product may be accessed.

To guide a user through a process of configuring and/or accessing features of products in a seamless fashion using the applications 24(0)-24(A), the browser software 20 executing on the processor device 12 of the computing device 10 displays a tutorial interface 28 using the display device 16. The tutorial interface 28 in some examples may be implemented using conventional browser-executable scripting languages and/or browser extensions, such as a browser extension 30. As seen in FIG. 1, the tutorial interface 28 includes a tutorial guide 32 that comprises a plurality of task links 34(0)-34(T) that are selectable by the user, and that each corresponds to one of the plurality of applications 24(0)-24(A). The task links 34(0)-34(T) may comprise hypertext links, clickable user interface buttons, or the like, as non-limiting examples. Some examples may provide that the task links 34(0)-34(T) are all displayed within the tutorial interface 28 at the same time, while some examples may provide that each of the task links 34(0)-34(T) may be made available one at a time to the user as the user progresses through the tutorial guide 32.

As the user engages with the tutorial interface 28, the processor device 12 executing the browser software 20 receives a first user input 36 via the user input device 18, where the first user input 36 indicates a selected task link (e.g., the task link 34(0), as a non-limiting example) within the tutorial interface 28. Upon receiving the first user input 36, the computing device 10 initiates execution of one of the applications 24(0)-24(A) corresponding to the selected task link 34(0) (e.g., the application 24(0), as a non-limiting example). As shown in FIG. 1, the executing application 24(0) is executed within the tutorial interface 28, without requiring a separate browser window or tab to be launched. In some examples, the selected task link 34(0) is further associated with an application guide 38 that is also displayed within the tutorial interface 28. The application guide 38 comprises a plurality of application-specific sub-task links 40(0)-40(S) that represent, for example, operations that the user is to perform to configure or access features of the application 24(0).

Execution of the application 24(0) within the tutorial interface 28 may be accomplished in different ways, depending on the implementation of the tutorial interface 28 and the application 24(0). In some examples, the browser software 20 retrieves browser-executable code 42 comprising the application 24(0) from the server computing device 22(0). The browser software 20 next injects the browser-executable code 42 into the tutorial interface 28 (e.g., by dynamically writing the browser-executable code 42 into the code underlying the tutorial interface 28). The browser-executable code 42 is then executed to provide the functionality of the application 24(0). Some examples may provide that the application 24(0) itself is configured to support execution as part of the tutorial guide 32. For instance, the application 24(0) may be configured to provide the same or similar top-level user interface elements and appropriate navigation links to return to the tutorial interface 28. In such examples, the application 24(0) may be executed within the tutorial interface 28 by directing the browser software 20 to the URL 26(0) corresponding to the application 24(0). According to some examples, the tutorial interface 28 may be configured to execute applications within an IFRAME 44. Accordingly, the application 24(0) may be executed within the tutorial interface 28 by directing the IFRAME 44 to the URL 26(0) corresponding to the application 24(0). It is to be understood that the application 24(0) may execute within a sub-portion of the tutorial interface 28 or may occupy the entire visible area of the tutorial interface 28.

When execution of the application 24(0) concludes (e.g., when the user successfully performs steps for configuring or accessing features of the product associated with the application 24(0)), the processor device 12 executing the browser software 20 receives, via the user input device 18, a second user input 46 indicating completion of the selected task link 34(0). In response to receiving the second user input 46, the browser software 20 displays the tutorial guide 32 in the tutorial interface 28, enabling the user to select another task link among the task links 34(0)-34(T) within the tutorial guide 32. For instance, the user may next select the task link 34(T) corresponding to the application 24(A), which causes the browser software 20 to initiate execution of the application 24(A) within the tutorial interface 28.

To assist the user in completing operations associated with each of the task links 34(0)-34(T), additional functionality may be provided by the tutorial interface 28. In some examples, during execution of the application 24(0), the computing device 10 may store a data element 48 representing information that the user may need to access later when executing another application, such as the application 24(A). Subsequently, during execution of the application 24(A), the data element 48 may be retrieved and supplied to the application 24(A). In this manner, the user is relieved of the need to manually record or recall the data element 48 provided during the earlier execution of the application 24(0). Some examples may provide that the tutorial interface 28 also assists the user by programmatically manipulating a user interface element (captioned as "UI ELEMENT" in FIG. 1) 50 (e.g., by automatically populating a text field or selecting a clickable button, as non-limiting examples) of the application 24(0) during execution. The user interface element 50 may be programmatically manipulated via an API 52 provided by the application 24(0), and/or may be programmatically manipulated via the browser extension 30 of the browser software 20.

Some examples may include a plurality of tutorial guides 32 from which a user can select. In such examples, it may be desirable to automatically relate different tutorial guides 32 and the user's activity on each for the purpose of bringing other ones of the applications 24(0)-24(A) to the user's attention. Accordingly, the computing device 10 in such examples may generate an ML model 54 based on the plurality of tutorial guides 32 and, based on the ML model 54, may identify one or more suggested applications 24(0)-24(A). In this manner, the ML model 54 may be used to dynamically recommend applications to the user based on the user's previous activity.

It is to be understood that, because the tutorial interface 28 may comprise software instructions that program the processor device 12 to carry out the functionality discussed herein, functionality implemented by the tutorial interface 28 may be attributed herein to the processor device 12 and/or to the computing device 10. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
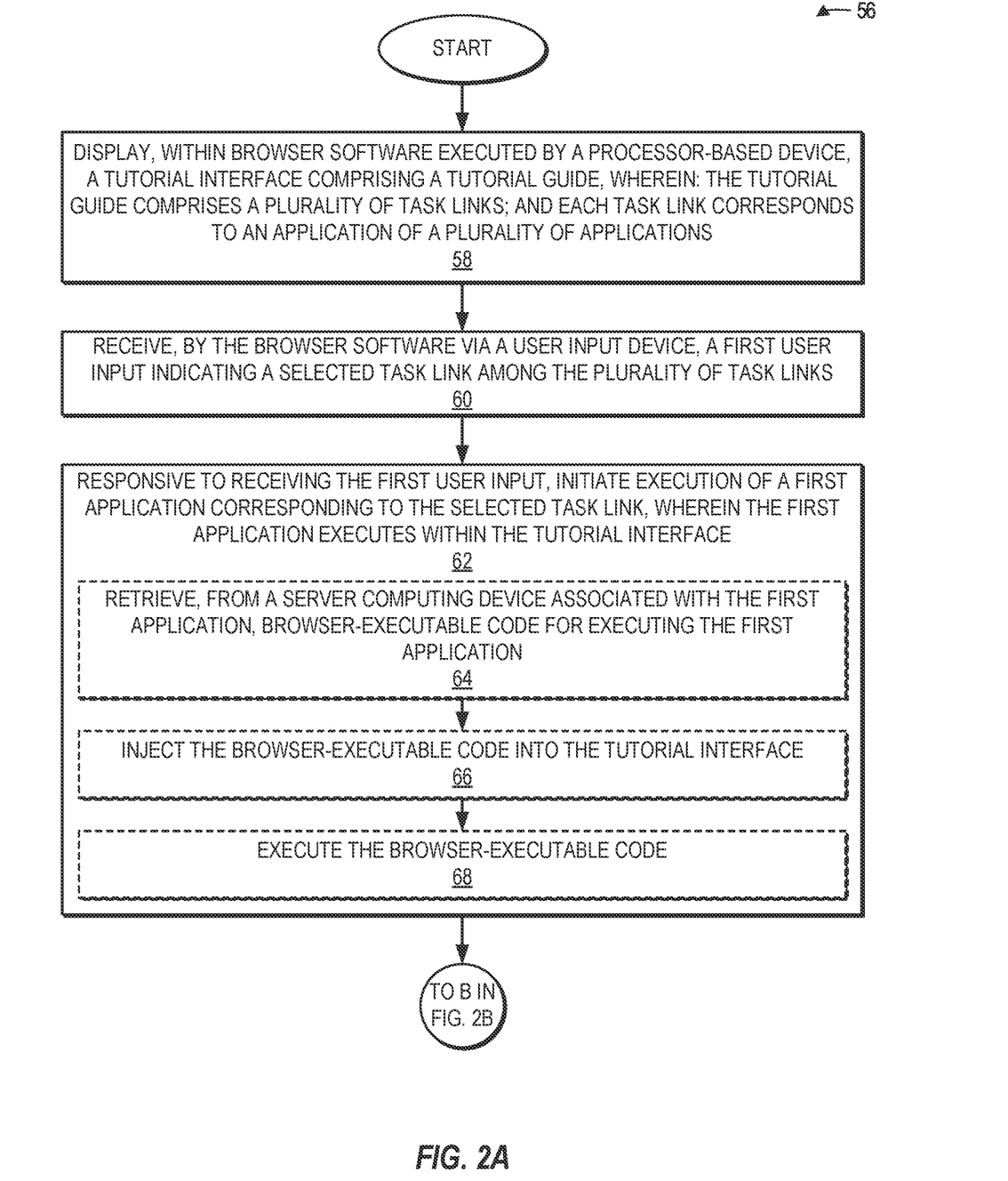
FIGS. 2A-2D are flowcharts illustrating exemplary operations for providing seamless integration of multiple applications in tutorials, according to one example.

To illustrate exemplary operations performed by the computing device 10 of FIG. 1 for providing seamless integration of multiple applications via tutorials according to one example, FIGS. 2A-2D provide a flowchart 56. Elements of FIG. 1 are referenced in describing FIGS. 2A-2D for the sake of clarity. It is to be understood that, in some examples, the operations illustrated in FIGS. 2A-2D may be performed in an order other than that illustrated herein, and/or may be omitted. In FIG. 2A, operations begin with the processor device 12, by executing the browser software 20, displaying a tutorial interface (e.g., the tutorial interface 28 of FIG. 1) comprising a tutorial guide (e.g., the tutorial guide 32 of FIG. 1), wherein the tutorial guide 32 comprises a plurality of task links (e.g., the task links 34(0)-34(T) of FIG. 1), and each task link corresponds to an application of a plurality of applications (e.g., the applications 24(0)-24(A) of FIG. 1) (block 58). The browser software 20 receives, via a user input device, such as the user input device 18 of FIG. 1, a first user input (e.g., the first user input 36 of FIG. 1) indicating the selected task link 34(0) among the plurality of task links 34(0)-34(T) (block 60).

Responsive to receiving the first user input 36, the browser software 20 initiates execution of a first application (such as the application 24(0) of FIG. 1) corresponding to the selected task link 34(0), wherein the first application 24(0) executes within the tutorial interface 28 (block 62). In some examples, the operations of block 62 for initiating execution of the first application 24(0) may comprise retrieving, from a server computing device associated with the first application 24(0) (e.g., the server computing device 22(0) of FIG. 1), browser-executable code for executing the first application 24(0), such as the browser-executable code 42 of FIG. 1 (block 64). The browser software 20 next injects the browser-executable code 42 into the tutorial interface 28 (block 66). The browser software 20 then executes the browser-executable code 42 (block 68). Exemplary operations of block 62 for initiating execution of the first application 24(0) in some examples continue in FIG. 2B.

Figure 2B:
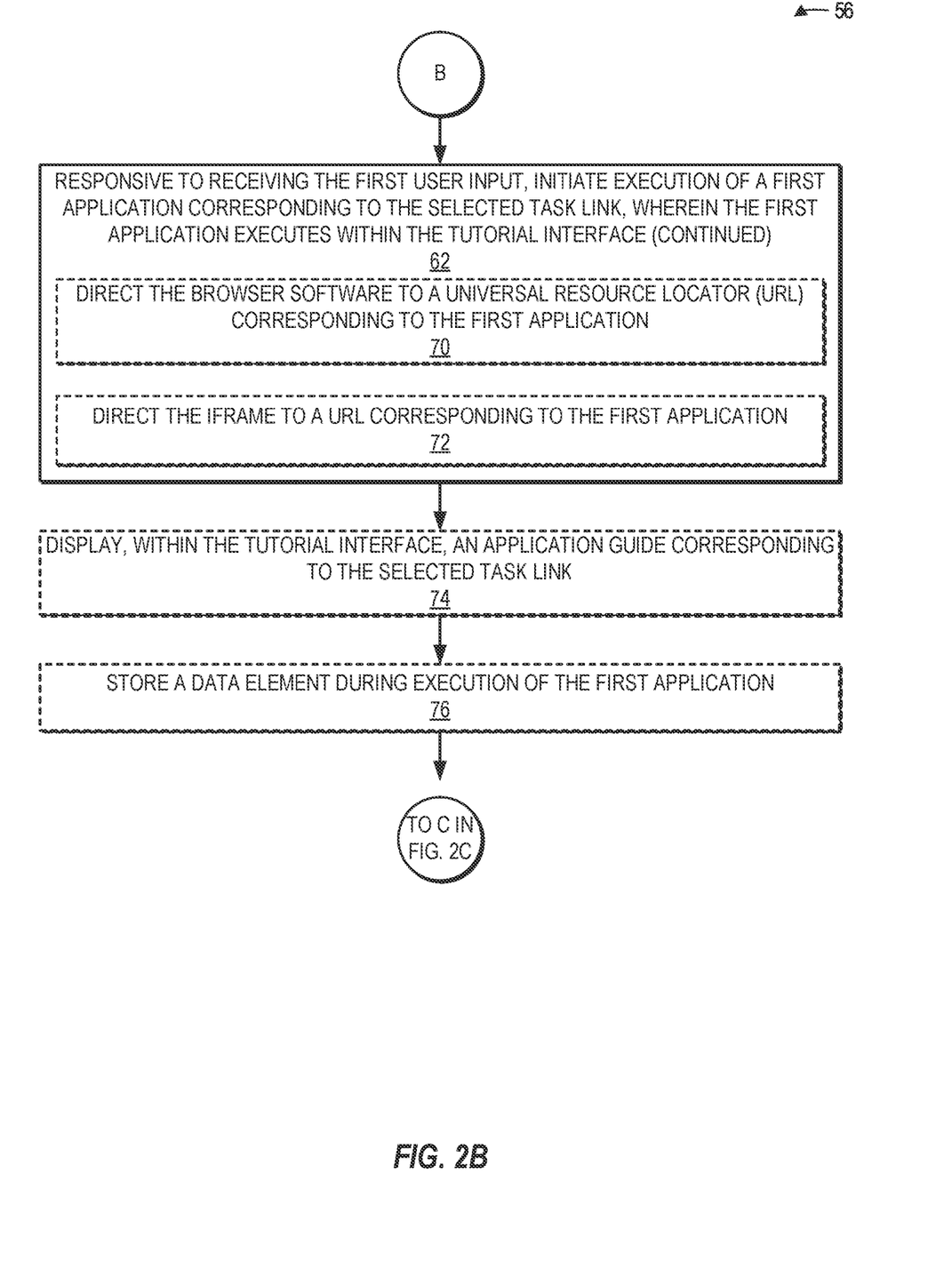

Referring now to FIG. 2B, some examples may provide that the operations of block 62 for initiating execution of the first application 24(0) may comprise directing the browser software 20 to a URL corresponding to the first application 24(0), such as the URL 26(0) of FIG. 1 (block 70). According to some examples, the operations of block 62 for initiating execution of the first application 24(0) may comprise directing an IFRAME (e.g., the IFRAME 44 of FIG. 1) to the URL 26(0) corresponding to the first application 24(0) (block 72).

In some examples, the browser software 20 may display, within the tutorial interface 28, an application guide corresponding to the selected task link 34(0), such as the application guide 38 of FIG. 1 (block 74). Some examples may provide that the browser software 20 may store a data element (e.g., the data element 48 of FIG. 1) during execution of the first application 24(0) (block 76). Operations in some examples may continue at block 78 of FIG. 2C.

Figure 2C:
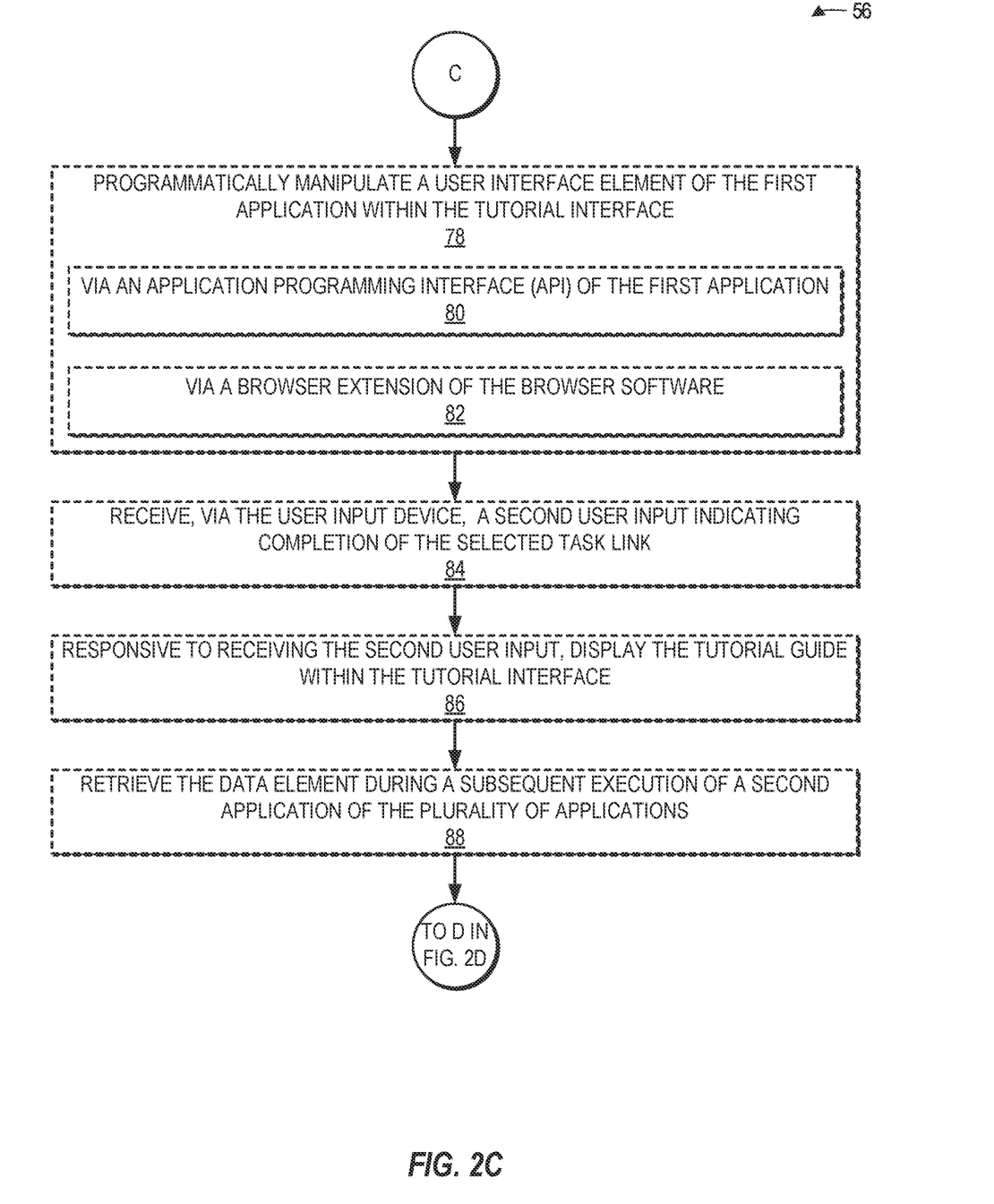

Turning now to FIG. 2C, the browser software 20 in some examples may programmatically manipulate a user interface element of the first application 24(0) (e.g., the user interface element 50 of FIG. 1) within the tutorial interface 28 (block 78). Some examples may provide that the operations of block 78 for programmatically manipulating the user interface element 50 may be accomplished via an API of the first application 24(0), such as the API 52 of FIG. 1 (block 80). According to some examples, the operations of block 78 for programmatically manipulating the user interface element 50 may be accomplished via a browser extension of the browser software 20, such as the browser extension 30 of FIG. 1 (block 82).

The browser software 20 in some examples may receive, via the user input device 18, a second user input (such as the second user input 46 of FIG. 1) indicating completion of the selected task link 34(0) (block 84). Responsive to receiving the second user input 46, the browser software 20 displays the tutorial guide 32 within the tutorial interface 28 (block 86). In examples according to block 76 of FIG. 2B in which the data element 48 is stored, the browser software 20 may retrieve the data element 48 during a subsequent execution of a second application of the plurality of applications 24(0)-24(A) (e.g., the application 24(A) of FIG. 1) (block 88). Operations in some examples may continue at block 90 of FIG. 2D.

Figure 2D:
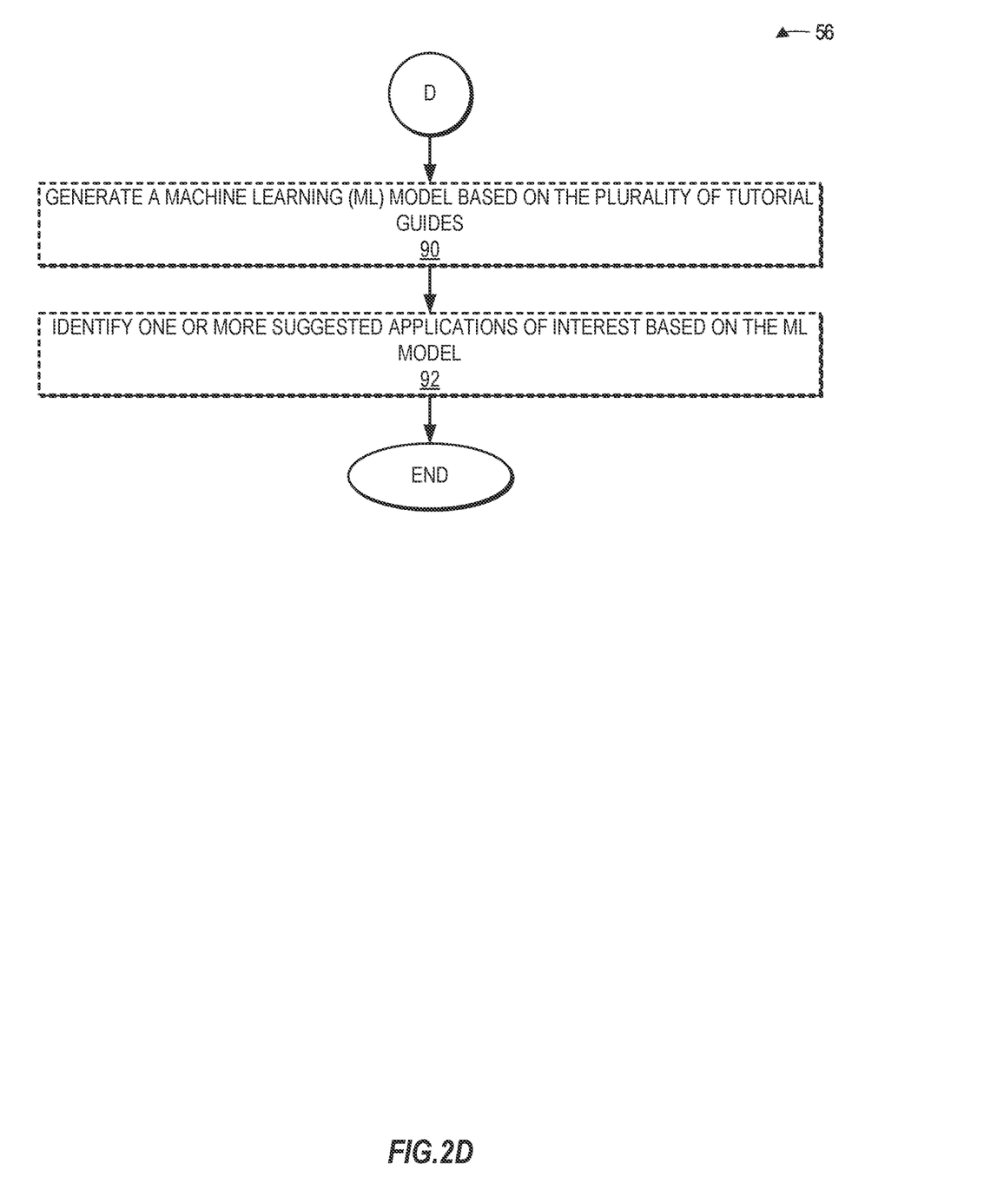

Referring now to FIG. 2D, the computing device 10 in some examples may generate an ML model, such as the ML model 54 of FIG. 1, based on a plurality of tutorial guides 32 (block 90). The computing device 10 may then identify one or more suggested applications of interest based on the ML model 54 (block 92).

Figure 3:
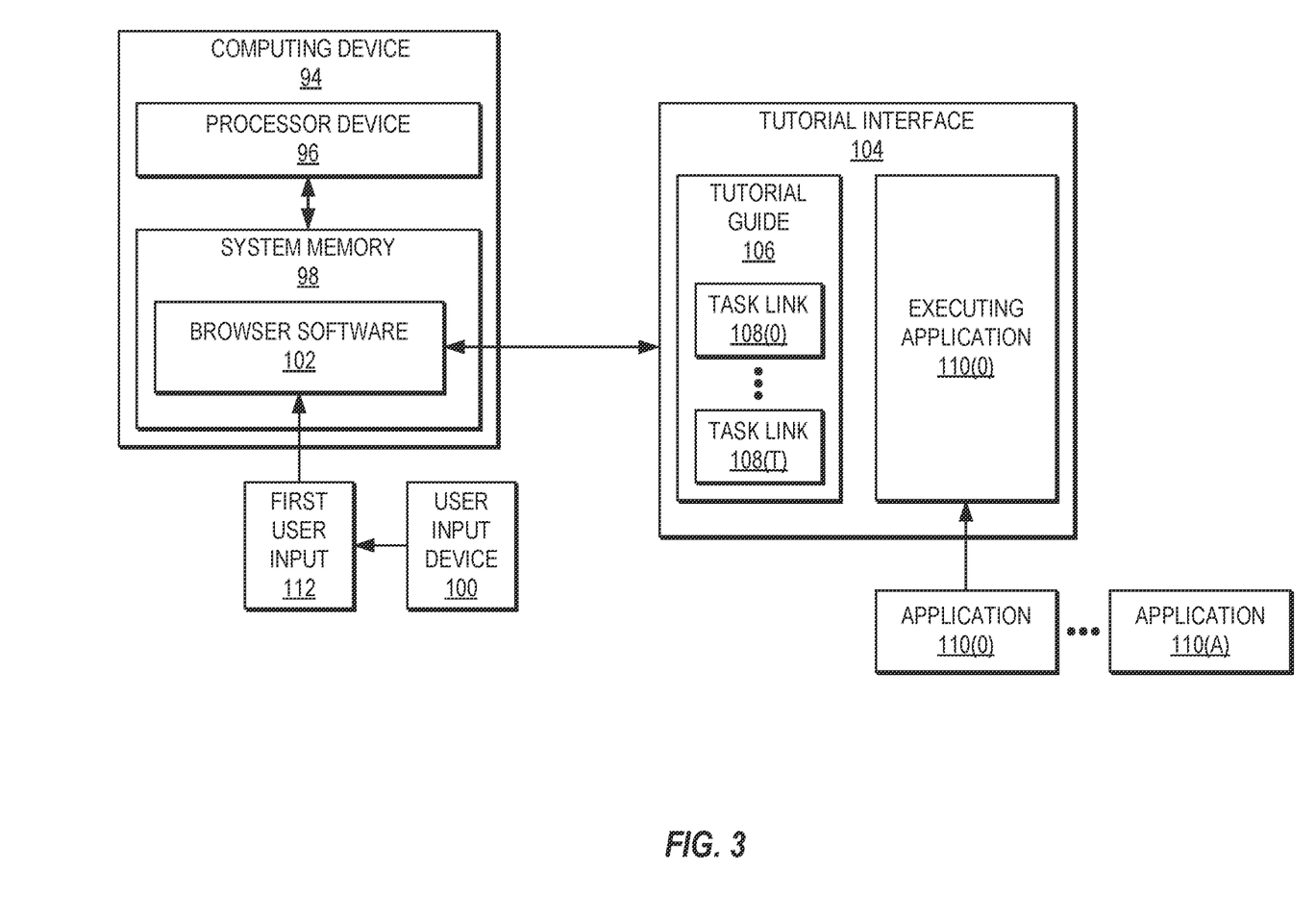
FIG. 3 is a simpler block diagram of the computing device of FIG. 1 for providing seamless integration of multiple applications in tutorials, according to one example.

FIG. 3 is a simpler block diagram of the computing device 10 of FIG. 1 for providing seamless integration of multiple applications via tutorials according to some examples. In FIG. 3, a computing device 94 includes a processor device 96 communicatively coupled to a system memory 98. The computing device 94 is also communicatively coupled to a user input device 100 through which a user (not shown) may provide input to software executing on the computing device 94. The processor device 96 of the computing device 94 executes browser software 102, which may comprise conventional or custom software for accessing web pages or web-based applications via URLs.

To guide a user through a process of configuring and/or accessing features of products in a seamless fashion, the browser software 102 executing on the computing device 94 displays a tutorial interface 104 that includes a tutorial guide 106 comprising a plurality of task links 108(0)-108(T) that are selectable by the user, and that each corresponds to one of a plurality of applications 110(0)-110(A). As the user engages with the tutorial interface 104, the browser software 102 receives a first user input 112 via the user input device 100, where the first user input 112 indicates a selected task link (e.g., the task link 108(0), as a non-limiting example) within the tutorial interface 104. Upon receiving the first user input 112, the computing device 94 initiates execution of one of the applications 110(0)-110(A) corresponding to the selected task link 108(0) (e.g., the application 110(0), as a non-limiting example). The executing application 110(0) is executed within the tutorial interface 104, without requiring a separate browser window or tab to be launched.

Figure 4:
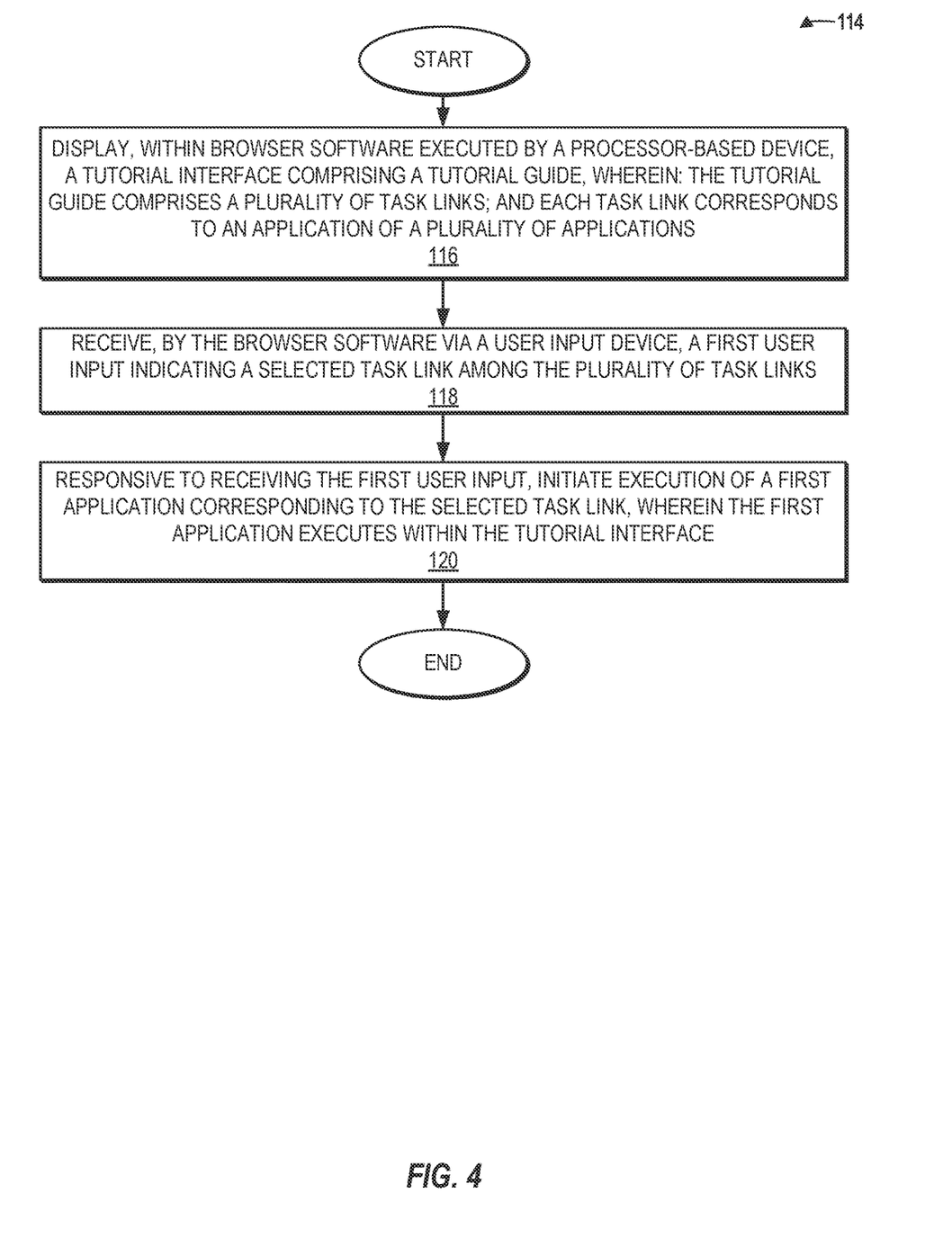
FIG. 4 is a flowchart of a simplified method for providing seamless integration of multiple applications in tutorials on the computing device of FIG. 3, according to one example.

FIG. 4 provides a flowchart 114 illustrating a simplified method providing seamless integration of multiple applications via tutorials on the computing device 94 of FIG. 3, according to one example. Elements of FIG. 3 are referenced in describing FIG. 4 for the sake of clarity. Operations in FIG. 3 begin with the browser software 102, executed by the processor device 96 of the computing device 94, displaying the tutorial interface 104 comprising the tutorial guide 106, wherein the tutorial guide 106 comprises the plurality of task links 108(0)-108(T), and each task link corresponds to an application of the plurality of applications 110(0)-110(A) (block 116). The browser software 102 receives, via the user input device 100, the first user input 112 indicating a selected task link 108(0) among the plurality of task links 108(0)-108(T) (block 118). Responsive to receiving the first user input 112, the browser software 102 initiates execution of the first application 110(0) corresponding to the selected task link 108(0), wherein the first application 110(0) executes within the tutorial interface 104 (block 120).

Figure 5:
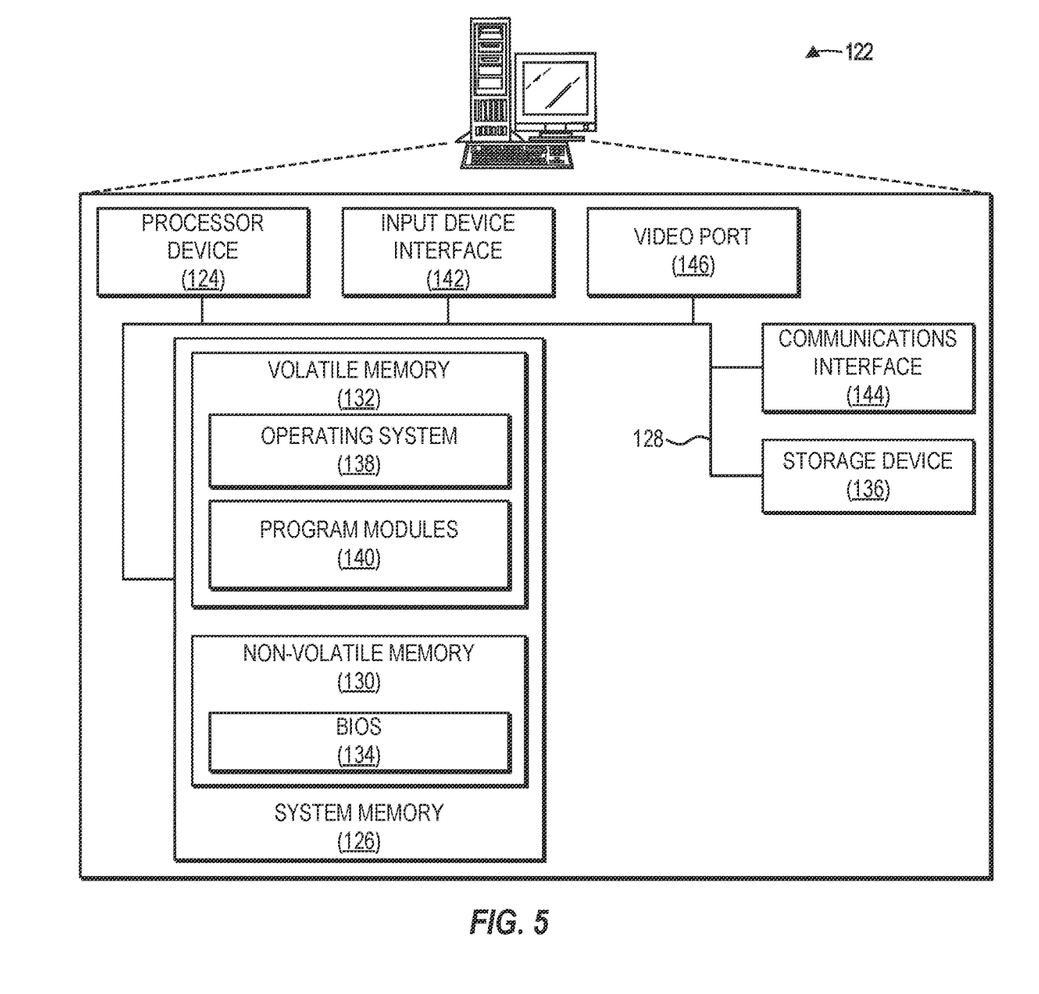
FIG. 5 is a block diagram of a computing device suitable for implementing examples, according to one example.

FIG. 5 is a block diagram of a computing device 122, such as the computing device 10 of FIG. 1, suitable for implementing examples according to one example. The computing device 122 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 122 includes a processor device 124, a system memory 126, and a system bus 128. The system bus 128 provides an interface for system components including, but not limited to, the system memory 126 and the processor device 124. The processor device 124 can be any commercially available or proprietary processor.

The system bus 128 may be any of several types of bus structures that may further interconnect to a memory bus (with or without a memory controller), a peripheral bus, and/or a local bus using any of a variety of commercially available bus architectures. The system memory 126 may include non-volatile memory 130 (e.g., read-only memory (ROM), erasable programmable ROM (EPROM), electrically EPROM (EEPROM), etc.), and volatile memory 132 (e.g., random access memory (RAM)). A basic input/output system (BIOS) 134 may be stored in the non-volatile memory 130 and can include the basic routines that help to transfer information among elements within the computing device 122. The volatile memory 132 may also include a high-speed RAM, such as static RAM, for caching data.

The computing device 122 may further include or be coupled to a non-transitory computer-readable storage medium such as a storage device 136, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 136 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 136 and in the volatile memory 132, including an operating system 138 and one or more program modules 140 which may implement the functionality described herein in whole or in part. It is to be appreciated that the examples can be implemented with various commercially available operating systems 138 or combinations of operating systems 138. All or a portion of the examples may be implemented as a computer program product stored on a transitory or non-transitory computer-usable or computer-readable storage medium, such as the storage device 136, which includes complex programming instructions, such as complex computer-readable program code, to cause the processor device 124 to carry out the steps described herein. Thus, the computer-readable program code can comprise software instructions for implementing the functionality of the examples described herein when executed on the processor device 124. The processor device 124 may serve as a controller, or control system, for the computing device 122 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 124 through an input device interface 142 that is coupled to the system bus 128 but can be connected by other interfaces, such as a parallel port, an Institute of Electrical and Electronic Engineers (IEEE) 13124 serial port, a Universal Serial Bus (USB) port, an infrared (IR) interface, and the like.

The computing device 122 may also include a communications interface 144 suitable for communicating with a network as appropriate or desired. The computing device 122 may also include a video port 146 to interface with a display device to provide information to a user. Individuals will recognize improvements and modifications to the preferred examples of the disclosure. All such improvements and modifications are considered within the scope of the concepts disclosed herein and the claims that follow.

What is claimed is:

1. A method, comprising:
    displaying, within browser software executed by a computing device, a tutorial interface comprising a tutorial guide, wherein:
        the tutorial interface comprises a first border and an inline frame (IFRAME);
        the tutorial guide comprises a plurality of task links; and
        each task link corresponds to an application of a plurality of applications;
    receiving, by the browser software via a user input device, a first user input indicating a selected task link among the plurality of task links; and
    responsive to receiving the first user input, initiating execution of a first application corresponding to the selected task link by directing the IFRAME to a Universal Resource Locator (URL) corresponding to the first application, wherein the first application executes within the IFRAME of the tutorial interface, the IFRAME comprising a second border that is presented within the first border.

2. The method of claim 1, wherein:
    each task link of the plurality of task links corresponds to an application guide of one or more application guides, each application guide comprising a plurality of application-specific sub-task links; and
    the method further comprises displaying, within the tutorial interface, an application guide corresponding to the selected task link concurrently with the IFRAME, the application guide identifying a plurality of operations a user is to perform using the first application.

3. The method of claim 1, wherein initiating the execution of the first application corresponding to the selected task link comprises:
    retrieving, from a server computing device associated with the first application, browser-executable code for executing the first application;
    injecting the browser-executable code into the tutorial interface; and
    executing the browser-executable code.

4. The method of claim 1, wherein:
    the first application is configured to support execution as part of the tutorial guide; and
    initiating the execution of the first application corresponding to the selected task link comprises directing the browser software to the Universal Resource Locator (URL) corresponding to the first application.

5. The method of claim 1, further comprising:
    receiving, via the user input device, a second user input indicating completion of the selected task link; and
    responsive to receiving the second user input, displaying the tutorial guide within the tutorial interface.

6. The method of claim 1, further comprising:
    storing a data element during the execution of the first application; and
    retrieving the data element during a subsequent execution of a second application of the plurality of applications.

7. The method of claim 1, further comprising, while executing the first application, programmatically manipulating a user interface element of the first application within the tutorial interface.

8. The method of claim 7, comprising programmatically manipulating the user interface element of the first application within the tutorial interface via an application programming interface (API) of the first application.

9. The method of claim 7, comprising programmatically manipulating the user interface element of the first application within the tutorial interface via a browser extension of the browser software.

10. The method of claim 1, wherein:
    the tutorial guide is one of a plurality of tutorial guides; and
    the method further comprises:
        generating a machine learning (ML) model based on the plurality of tutorial guides; and
        identifying one or more suggested applications based on the ML model.

11. A computing device, comprising:
    a system memory; and
    a processor device communicatively coupled to the system memory, the processor device to:
        display, within browser software, a tutorial interface comprising a tutorial guide, wherein:
            the tutorial interface comprises a first border and an inline frame (IFRAME);
            the tutorial guide comprises a plurality of task links; and
            each task link corresponds to an application of a plurality of applications;
        receive, using the browser software via a user input device, a first user input indicating a selected task link among the plurality of task links; and
        responsive to receiving the first user input, initiate execution of a first application corresponding to the selected task link by directing the IFRAME to a Universal Resource Locator (URL) corresponding to the first application, wherein the first application executes within the IFRAME of the tutorial interface, the IFRAME comprising a second border that is presented within the first border.

12. The method of claim 1, further comprising:
    receiving, via the user input device, a second user input indicating completion of the selected task link;
    receiving, via the user input device, a third user input indicating a second selected task link among the plurality of task links; and
    responsive to receiving the third user input, initiating execution of a second application corresponding to the second selected task link by directing the IFRAME to a URL corresponding to the second application, wherein the second application executes within the IFRAME of the tutorial interface.

13. The computing device of claim 11, wherein:
    each task link of the plurality of task links corresponds to an application guide of one or more application guides, each application guide comprising a plurality of application-specific sub-task links; and
    the processor device is further to display, within the tutorial interface, an application guide corresponding to the selected task link concurrently with the IFRAME, the application guide identifying a plurality of operations the user is to perform using the first application.

14. The computing device of claim 11, wherein to initiate the execution of the first application corresponding to the selected task link is to:
    retrieve, from a server computing device associated with the first application, browser-executable code for executing the first application;
    inject the browser-executable code into the tutorial interface; and
    execute the browser-executable code.

15. The computing device of claim 11, wherein:
the first application is configured to support the execution as part of the tutorial guide; and
to initiate the execution of the first application corresponding to the selected task link is to direct the browser software to the Universal Resource Locator (URL) corresponding to the first application.

16. The computing device of claim 11, wherein the processor device is further to:
receive, via the user input device, a second user input indicating completion of the selected task link; and
responsive to receiving the second user input, display the tutorial guide within the tutorial interface.

17. The computing device of claim 11, wherein the processor device is further to:
store a data element during the execution of the first application; and
retrieve the data element during a subsequent execution of a second application of the plurality of applications.

18. The computing device of claim 11, wherein the processor device is further to, while executing the first application, programmatically manipulate a user interface element of the first application within the tutorial interface.

19. A non-transitory computer-readable medium having stored thereon computer-executable instructions that, when executed, cause one or more processor devices to:
display, within browser software, a tutorial interface comprising a tutorial guide, wherein:
the tutorial interface comprises a first border and an inline frame (IFRAME);
the tutorial guide comprises a plurality of task links; and
each task link corresponds to an application of a plurality of applications;
receive, using the browser software via a user input device, a first user input indicating a selected task link among the plurality of task links; and
responsive to receiving the first user input, initiate execution of a first application corresponding to the selected task link by directing the IFRAME to a Universal Resource Locator (URL) corresponding to the first application, wherein the first application executes within the IFRAME of the tutorial interface, the IFRAME comprising a second border that is presented within the first border.

\* \* \* \* \*